Patented Nov. 23, 1948

2,454,491

UNITED STATES PATENT OFFICE 2,454,491

METHOD OF REPRODUCING SOUND MOTION PICTURES IN SYNCHRONISM WITH THE PICTURE AND SOUND ON SEPARATE MEDIA

Lloyd Thompson, Kansas City, Mo.

Application November 19, 1945, Serial No. 629,569

3 Claims. (Cl. 88—16.2)

This invention relates to the art of producing sound motion pictures and has for its primary aim the provision of a method and apparatus for making it possible to project motion pictures in synchronism with the production of accompanying sound, the media for projecting the pictures and creating the sound being separate from each other but operated by means insuring simultaneous starting and practical synchronism throughout the time of their operation.

Another important aim of this invention is the provision of a method of preparing sound motion pictures from conventional type moving picture sound film after the latter has been made so that the projection of the motion pictures and the sound to accompany the same are on separate media.

A still further object of this invention is to provide a method of reproducing eight millimeter sound motion pictures with the pictures and the sound on separate media from sixteen or thirty-five millimeter sound motion picture film to the end that the eight millimeter motion pictures may be projected at the rate of sixteen frames per second while the sound accompanying the showing of the eight millimeter motion pictures is reproduced at the same rate of speed of twenty-four frames per second at which it is normally produced when utilized with the sixteen or thirty-five millimeter motion picture film.

This invention has for a yet further aim to provide a system of reproducing sound motion pictures in synchronism with the picture and sound on separate media, which system embodies means in the sound track for initiating the motivation of the motion picture projector to insure simultaneous starting of the media carrying the motion pictures being projected and the means upon which the sound track is formed.

This invention has for even further objects to provide apparatus for performing the steps in the method above set down which apparatus comprises essentially a motion picture projector and a record player with instrumentalities interconnecting the same whereby synchronism in operation throughout the period of projection is insured and further, whereby the starting of the projector and record player simultaneously occurs at a predetermined instant.

Figure 1:
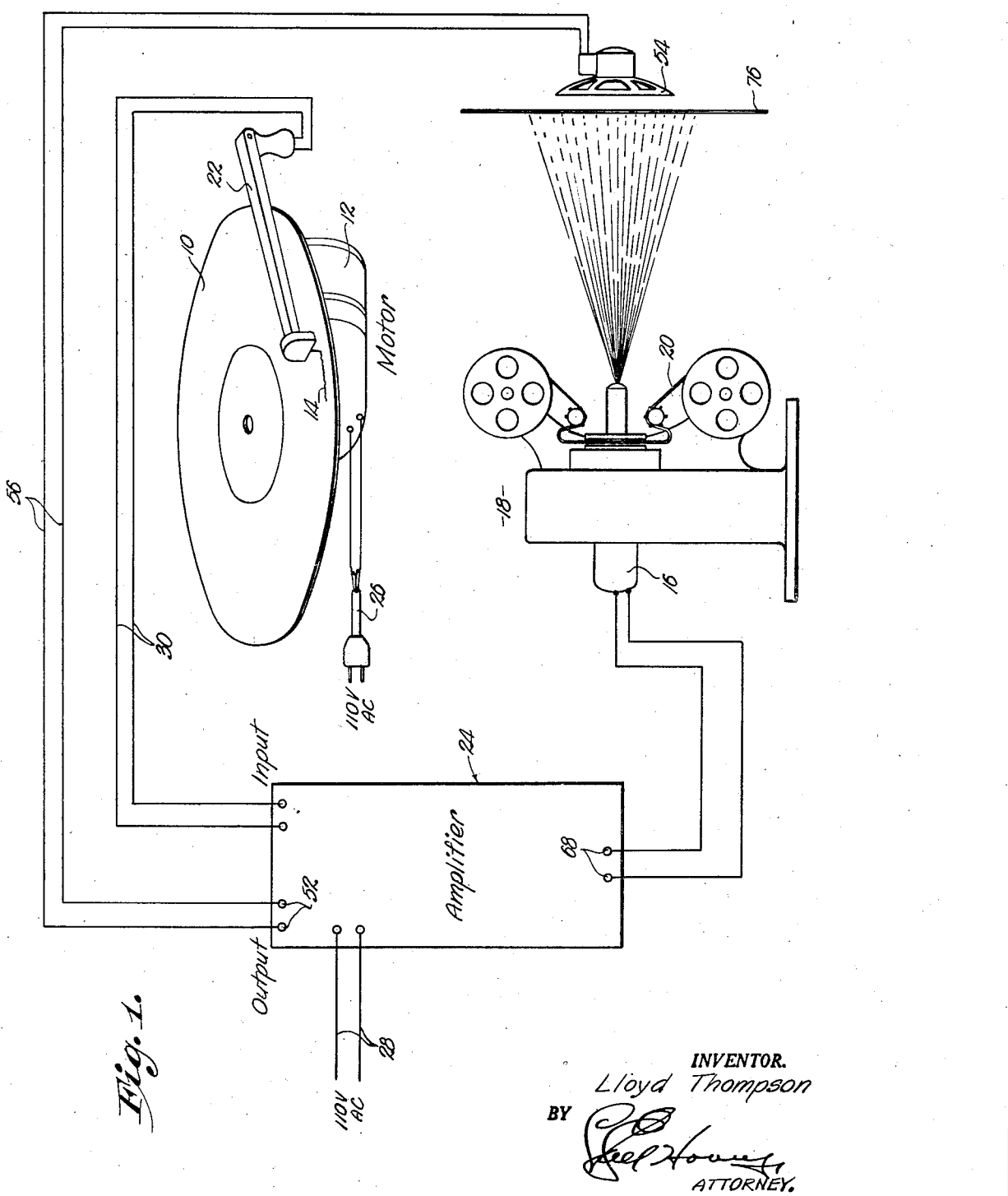
Figure 2:
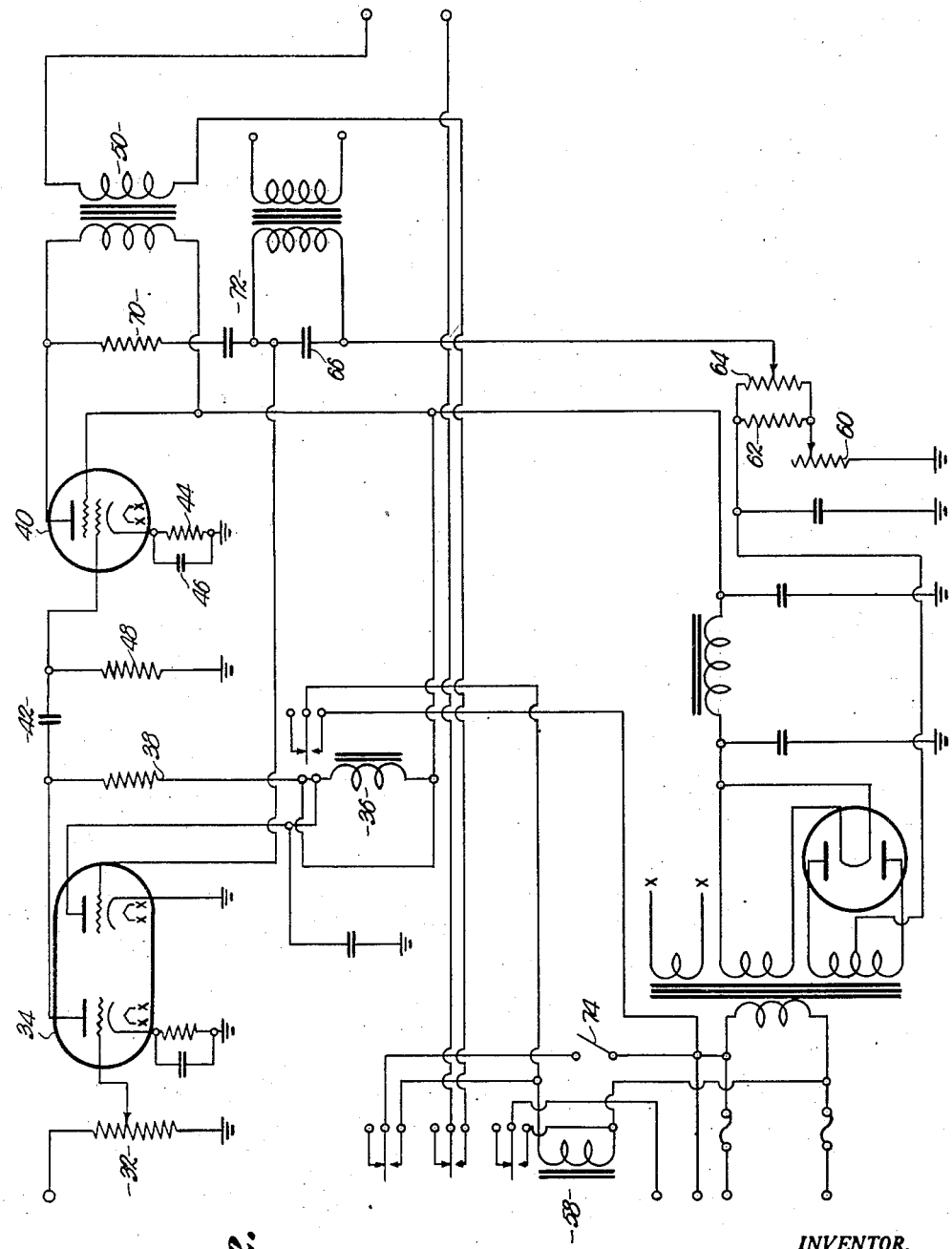

Other aims of the invention will appear during the course of the following specification referring to the accompanying drawings, wherein:

Fig. 1 is a schematic view illustrating one manner of embodying the invention in apparatus for projecting motion pictures and creating accompanying sound therefor and in synchronism therewith; and Fig. 2 is a wiring diagram illustrating the way in which the amplifier may be constructed.

The field of amateur motion picture photography is presently limited because the user of eight millimeter projectors cannot use larger film such as sixteen or thirty-five millimeter sound motion picture film and because this larger film is produced at the rate of twenty-four frames per second, its reconversion or transfer into eight millimeter film has apparently not occurred to those handling such equipment. The usual methods of transfer on reduction from the larger sizes to the smaller eight millimeter size calls for the same sound track and photographic reproduction of track when the smaller film is being made.

In order to project the eight millimeter film at the rate of sixteen frames per second, some method of eliminating every third frame without affecting the sound track is necessary.

Synchronism between the picture being projected and the sound is a necessity and since the sound and pictures are on separate media, simultaneous starting at related points presents one of the problems which my invention has solved. In following the steps of the method, the sound of the relatively large film is re-recorded separately on a phonograph record and the eight millimeter film is produced from the larger film by making a special print and eliminating every third frame, thus bringing the film speed back to sixteen frames per second. At this juncture it is notable that no part of the sound track is eliminated and while the sound is reproduced at the standard speed of twenty-four frames per second, the film is projected at the rate of sixteen frames per second.

The apparatus that I have successfully utilized is diagrammatically shown in Fig. 1 where the record 10 of a phonograph which is driven by a motor 12, has the sound of the relatively large motion picture film reproduced thereon. A part of the sound track of record 10 causes the production of a sound impulse of predetermined frequency and the short length of the sound track 14 may be at any point where it is desired to have motor 16 of the projector 18 start and thereby initiate movement of film 20 through projector 18 in the usual fashion.

Motors 12 and 16 are synchronous to insure positive related driving action of the phonograph and projector. Projector 18 and the phonograph which includes tone arm 22, are of conventional character and motor 16 of projector 18 is connected to the amplifier broadly designated by the numeral 24. Motor 12 is connected to a suitable source of power through an extension cord 26 and because the equipment is usually employed where 110 volt A. C. current is available, motor 12 is capable of being driven thereby. Amplifier 24 is connected to a similar source of current through leads 28 and the output of the crystal phonograph pick-up 22 is fed into amplifier 24 by conductors 30. The circuit which has proven satisfactory so far as amplifier 24 is concerned is diagrammatically illustrated in Fig. 2 and in that circuit potentiometer 32 is employed for the purpose of adjusting the amplitude of the signal fed to the grid of tube 34. This tube 34 is a dual triode vacuum tube; the first triode section thereof serves as a class A audio voltage amplifier. The second section functions as a control tube to supply adequate operating current for the relay 36. The audio voltage amplified through the first triode section and across the load resistance 38 is coupled to the grid of tube 40 through an .01 coupling capacitor 42. Tube 40 is a metal beam power amplifier tube and the correct bias is maintained on its grid by means of the cathode bias resistor 44 and by capacitor 46 and grid resistor 48.

The audio power developed in tube 40 is fed to the primary of the dual output transformer 50 and the secondary of the audio section of transformer 50 is connected to the output posts 52 from where it is fed to speaker 54 through conductors 56. One section of the dual output transformer 50, together with relays 36 and 58 and one section of tube 34 and its associated circuit, form the control circuits. The triode section of tube 34 is biased to cut off by means of the bias net work 60, 62 and 64 with the result that when no signal is applied to the grid there will be no plate current flowing through the winding of the relay 36.

A capacitor 66 calculated to resonate transformer 50 at a frequency of 1000 cycles is connected across the primary of the control section of the dual output transformer. Upon application of a sustained 1000 cycle audio voltage to the input 68, amplification will occur through the first section of tube 34 and through tube 40. From the plate circuit of tube 40 the 1000 cycle voltage is coupled to the control section of transformer 50 by means of a relay coupling circuit 70 and 72. Time relay coupling is employed to prevent a momentary 1000 cycle voltage from operating the relay 36. Due to the primary of the control section of transformer 50 being resonate at 1000 cycles, voltages of other frequencies will not develop sufficient potential across transformer 50 to overcome the bias of control tube 34 and operate the relay 36. With 1000 cycle voltage being developed across the resonate primary of the two, the bias of the control section of tube 34 is overcome, plate current flows to operate relay 36 which applies 110 volts to relay 58 to close its contacts, which in turn applies 110 volts A. C. to the contacts 68 to supply current to the synchronous motor 16 of projector 18. Relay 58 is locked closed until the normally closed switch 74 is opened to interrupt the supply of A. C. voltage to the winding of relay 58. A conventional power supply furnishes plate and filament voltage to operate tubes 34 and 40.

The foregoing explanation of that part of the circuit within amplifier 24 is sufficient to clarify the manner in which this amplifier serves to start projector 18 at the instant the needle of arm 22 reaches that portion of track 14 which has been purposely supplied at the time when film 20 is to commence its movement through the projector.

The use of a frequency of 1000 cycles per second is indicative of the manner in which any frequency may be employed to initiate the operation of motor 16 and it will be obvious to those skilled in the art that any frequency may be employed.

In practice the turn-table upon which record 10 is mounted may rotate said record for any length of time and until that part 14 of the sound track is encountered—whereupon projector 18 will start operating. The sound track on record 10 has been made to relate itself to the picture projected upon screen 76 and as the picture is shown the sound will be in practical synchronism therewith. When the present method is followed to convert sixteen or thirty-five millimeter sound motion pictures to eight millimeter film, the speed of the sound track remains the same, but the projection of the motion picture with every third frame eliminated combines with the sound in a way that is not detectable by the observer and therefore, effective and satisfactory production of reproducing sound motion pictures for amateur use from commercial type film is possible.

The foregoing method is not limited to the production of eight millimeter film from large commercial size motion picture sound film but may be employed in producing motion pictures where the equipment is incapable of supplying and utilizing a sound track on the film per se. A record may be made to include any material that is to be announced with the showing of the projected pictures and to eliminate the inaccuracies of synchronous starting due to the human element, the electrical impulse is the controlling medium for the starting of the motor forming a part of the projecting machine.

Limitless possibilities arise from the broad concepts forming the invention above described and therefore it is desired to be limited from the enjoyment thereof only by the scope of the appended claims.

Having thus described the invention, what I claim as new and desire to secure by Letters Patent is:

1. The method of reproducing sound motion pictures originally produced with the picture and sound on a film of one size through use of a projector capable only of projection of films of different sizes, which method comprises the steps of re-recording the sound from said film on a phonograph record; creating an impulse of predetermined frequency on said record as the sound is re-recorded; reproducing the pictures from said film on another film; playing said record at one speed; and simultaneously projecting the pictures through use of said projector at a different speed as the latter is started by said impulse.

2. The method of reproducing sound motion pictures originally produced with the pictures and sound on a film of one size through use of a projector capable only of projection of films of a smaller size, which method comprises the steps of re-recording the sound from said film on a phonograph record; creating an impulse of predetermined frequency on said record as the sound is re-recorded; reproducing the pictures from said film on a film of said smaller size; playing said record at the rate of twenty-four frames per second; and simultaneously projecting the pictures through use of said projector at the rate of sixteen frames per second as the latter is started by said impulse.

3. The method of reproducing sound motion pictures originally produced with the pictures and sound on a film of one size through use of a projector capable only of projection of films of a smaller size, which method comprises the steps of re-recording the sound from said film on a phonograph record; creating an impulse of predetermined frequency on said record as the sound is re-recorded; reproducing the pictures from said film on a film of said smaller size; playing said record at the rate of twenty-four frames per second; and simultaneously projecting the pictures through use of said projector at the rate of sixteen frames per second as the latter is started by said impulse, said film of one size being sixteen millimeter, said films of smaller size being eight millimeter.

LLOYD THOMPSON.

REFERENCES CITED

The following references are of record in the file of this patent:

UNITED STATES PATENTS

| Number | Name | Date |
| --- | --- | --- |
| 1,528,424 | Holland | Mar. 3, 1925 |
| 1,825,598 | Vogt et al. | Sept. 29, 1931 |
| 1,859,665 | Golden et al. | May 24, 1932 |
| 1,866,712 | Jones | July 12, 1932 |
| 1,915,262 | Howell | June 20, 1933 |
| 1,934,514 | Thun | Nov. 7, 1933 |
| 2,018,812 | Schmidt | Oct. 29, 1935 |
| 2,116,314 | Jenkins et al. | May 3, 1938 |
| 2,221,312 | Jenkins et al. | Nov. 12, 1940 |
| 2,354,583 | Eddy | July 25, 1944 |

FOREIGN PATENTS

| Number | Country | Date |
| --- | --- | --- |
| 329,785 | Great Britain | May 29, 1930 |
| 719,351 | France | Nov. 14, 1931 |